United States Patent [19]

Isshiki et al.

[11] Patent Number: 5,288,141
[45] Date of Patent: Feb. 22, 1994

[54] ANTILOCK BRAKE SYSTEM WITH INTEGRAL HOUSINGS FOR A JUNCTION BLOCK AND ELECTRONIC CONTROL UNIT

[75] Inventors: Isao Isshiki; Toshihiro Toda; Hitoshi Hashiba, all of Osaka; Takao Nozaki; Masahide Hio, both of Mie, all of Japan

[73] Assignees: Sumitomo Wiring Systems, Ltd., Mie; Sumitomo Electric Industries, Ltd., Osaka, both of Japan

[21] Appl. No.: 900,465

[22] Filed: Jun. 18, 1992

[30] Foreign Application Priority Data

Jun. 20, 1991 [JP] Japan .................. 3-177132

[51] Int. Cl.⁵ .................................. B60T 8/00
[52] U.S. Cl. .................. 303/113.1; 303/119.1; 439/34
[58] Field of Search .......... 303/20, 113.1, 116.1, 303/119.1; 439/34, 639

[56] References Cited

U.S. PATENT DOCUMENTS

| 4,697,863 | 10/1987 | Galloway et al. | 439/544 |
| 4,954,085 | 9/1990 | Inoue et al. | 439/34 |
| 5,022,717 | 6/1991 | Heibel et al. | 439/34 X |
| 5,040,853 | 8/1991 | Burgdorf et al. | 303/113.1 X |
| 5,137,455 | 8/1992 | Moerbe et al. | 439/34 |

FOREIGN PATENT DOCUMENTS

2568205  1/1986  France .

*Primary Examiner*—Robert J. Oberleitner
*Assistant Examiner*—Josie A. Ballato
*Attorney, Agent, or Firm*—Sughrue, Mion, Zinn, Macpeak & Seas

[57] ABSTRACT

An antilock brake system is constructed in such a manner that a housing 61 of an electronic unit 6 is connected integrally to a housing of a hydraulic unit main body 5 for controlling brake fluid pressures, and an upper housing 71 of a junction block 7 is connected to the housing 61 of the electronic unit 6. An electric wiring section for the electronic unit 6 is constituted by bus bars 75 incorporated in the junction block 7. Even in the event that the antilock brake system is equipped on an automobile, the number of wiring harnesses extending between the engine compartment and the passenger compartment can be reduced. In addition, the number of components that are mounted on the automobile can also be reduced, thereby making it possible to reduce the man hour for fabrication.

5 Claims, 7 Drawing Sheets

ANTILOCK BRAKE SYSTEM WITH INTEGRAL HOUSINGS FOR A JUNCTION BLOCK AND ELECTRONIC CONTROL UNIT

BACKGROUND OF THE INVENTION

1. Field of the Invention

The present invention relates to an antilock brake system for an automobile adapted to prevent locking of the wheels of the automobile by adjusting the pressure of brake fluid when applying a quick brake or the brake on a slippery road, and more particularly to the structural characteristics of such an antilock brake system.

2. Statement of the Prior Art

There is devised as one of the systems to improve the safety of automobiles an antilock brake system adapted to prevent locking of the wheels of an automobile when applying a quick brake or the brake on a slippery road. Recently, as the demand for high-performance automobiles has been increasing, there is a tendency that many automobiles equipped with the aforesaid antilock brake system are produced.

A conventional antilock brake system will be described with reference to FIGS. 7 and 8.

FIG. 7 is a schematic explanatory view showing a conventional antilock brake system, and FIG. 8 is a diagram showing connections of electric wires.

As shown in FIG. 7, the conventional antilock brake system comprises rotation detectors 101 to 104, a hydraulic unit 105, an electronic unit 106, and a relay box 107, and the construction thereof will schematically be described as below.

The rotation detectors 101 to 104 are intended to detect the rotating conditions of wheels A to D, and are provided on the wheels A to D, respectively. The rotation detectors 101 to 104 each comprise sensors 101a to 104a, and sensor rotors 101b to 104b. The sensors 101a to 104a each are constituted by permanent magnets, coils, and pole pieces, and are mounted on the steering knuckles, with the front wheels, and on the hub spindles, with the rear wheels. The sensor rotors each comprise concaves and convexes (not shown) circumferentially arranged at equal intervals on the outer circumferences, and are mounted on the drive shafts, with the front wheels, and on the rear hubs, with the rear wheels.

Therefore, the sensor rotors 101b to 104b rotate integrally with the wheels A to D. The sensors 101a to 104a detect the rotating conditions of the wheels A to D by detecting the concaves and convexes on the outer circumferences of the sensor rotors 101b to 104b while the rotors are rotating. The rotation detectors 101 to 104 then send out detected signals to the electronic unit 106.

FIG. 8 is one example of connections of electric wires used in the conventional antilock brake system. The hydraulic unit 105 controls the pressure of brake fluid for the wheel cylinders by controlling the switching of four solenoid valves 105a to 105d, which is carried out based on control signals sent from the electronic unit 106. The hydraulic unit 105 has a motor 105e for driving a pump, not shown, for making brake fluid flow back to the master cylinder for applying pressure thereon.

The electronic unit 106 calculates the wheel speed and the acceleration and negative acceleration of the wheel on the basis of the detected signals sent from the rotation detectors 101 to 104 and estimates the vehicle speed, and monitors whether or not there exists any wheel that will be locked if the brake is applied in a state so calculated. In a case where the electronic unit 106 judges that there is or are wheels that will be locked, it then controls the solenoid valves 105a to 105d of the hydraulic unit 105 so as to reduce the brake fluid pressure with respect to the wheel cylinders of the wheels so judged. In a case where the electronic unit 106 judges that the locking of the relevant wheels is avoided, it then controls the switching of the solenoid valves 105a to 105d so as to increase the brake fluid pressure again.

The relay box 107 incorporates a motor relay 107a for switching on and off the motor 105e and a fail safe relay 107b for interrupting the power source for the solenoid valves 105a to 105d of the hydraulic unit 105 and the motor relay in the event that irregularity takes place in the antilock brake system.

In the conventional antilock brake system, as shown in FIG. 7, it is common practice that the hydraulic unit 105 and the relay box 107 are disposed in the engine compartment, while the electronic unit 106 is disposed under the seat or inside the front panel. As mentioned above, the rotation detectors 101 to 104 are mounted on the wheel portions. In FIG. 8, reference numeral 108 denotes a battery for the automobile, reference numeral 109 an ignition switch, reference numeral 110 a stop lamp switch disposed in the vicinity of the brake pedal, and reference numeral 111 a stop lamp constituting a part of the rear lamp.

In current automobiles, as the demand for high-performance automobiles has been increasing, the number of electronic units used also increases. On top of this, on many occasions securing of wider room space is demanded. However, when the electronic unit 106 is disposed in the passenger compartment as before, a large number of long wiring is required for electrically connecting this electronic unit 106 to the inside of the engine compartment, resulting in a drawback in that it is difficult to meet the demand for securing wider room space.

In addition, as in the case of the conventional antilock brake system, when the hydraulic unit 105 and the electronic unit 106 are separately installed in the engine compartment and the passenger compartment, respectively, a process of providing the aforesaid wiring harnesses for effecting electric connections between these two components is required, which creates a problem when trying to improve the manufacturing productivity of automobiles. In particular, in current automobiles, there is a tendency that not only the antilock brake system but also a lot of systems that have not been employed before are equipped on automobiles, which requires more wiring harnesses, making a wiring harness mounting operation complicated. In order to cope with the simplification of the process, it is desired to reduce the necessity of wiring.

SUMMARY OF THE INVENTION

A general object of the present invention is to improve the efficiency of producing automobiles equipped with an antilock brake system.

A specific object of the present invention is to provide an antilock brake system that can contribute to securing wider room space in an automobile, and which can simplify the wiring harness mounting operation so as to make the electric unit integral with the relays of the antilock brake system disposed in the engine compartment, thereby making it possible to dispose the electronic unit inside the engine compartment as well.

With a view to accomplishing the above objects, an antilock brake system based on a first idea of the present invention comprises sensors for detecting, respectively, the rotating conditions of the wheels of an automobile, a hydraulic unit for controlling brake fluid pressures applied to wheel cylinders of the respective wheels via electric control signals, an electronic unit incorporating a circuit for forming the electric control signals for controlling switching of solenoid valves based on the detected signals of the sensors so that the wheels are not locked, and two relays, one electrically connected to solenoid valves of said hydraulic unit and said circuit of said electronic unit, another electrically connected to motor of said hydraulic unit and said circuit of said electronic unit and disposed inside the engine compartment, the antilock brake system further comprising a junction block having a housing connected integrally to the housing of the electronic unit, a group of terminals provided in the housing for electric connection with the relay, and an electric wiring section incorporated in the housing for effecting electric connection between the circuit of the electronic unit and the groups of terminals.

An antilock brake system according to a second idea of the present invention comprises sensors for detecting, respectively, the rotating conditions of the wheels of an automobile, a hydraulic unit for controlling brake fluid pressures applied to wheel cylinders of the respective wheels via electric control signals, an electronic unit incorporating a circuit for forming the electric control signals for controlling switching of solenoid valves based on the detected signals of the sensors so that the wheels are not locked, and two relays, one electrically connected to solenoid valves of said hydraulic unit and said circuit of said electronic unit, another electrically connected to motor of said hydraulic unit and said circuit of said electronic unit and disposed inside the engine compartment, the antilock brake system further comprising a first connector connected at least to a wiring harness including wiring connected to the sensors, a second connector connected at least to a wiring harness including wiring for giving control signals to the hydraulic unit, and a junction block having a housing connected integrally to the housing of the electronic unit, a first group of terminals to which the respective relays are electrically connected, a second group of terminals to which the first connector is electrically connected, a third group of terminals to which the second connector is electrically connected, the first, second, and third groups of terminals being provided in the housing of the junction block, and an electric wiring section incorporated in the housing for effecting electric connection at least between the circuit of the electronic unit and the first, second, and third groups of terminals.

In either of the aforesaid antilock brake systems, the housing of the electronic unit is preferably connected integrally to that of the hydraulic unit.

In the antilock brake system according to the first idea, the relay and the circuit of the electronic unit are connected to each other by connecting the relay to the group of terminals provided in the housing of the junction block. In addition, since the relay is connected to the group of terminals provided in the housing of the junction block, and since the housings of the junction block and electronic unit are connected integrally to each other, the relay and the electronic unit are made integral. Thus, the electronic unit made integral with the relay is disposed inside the engine compartment. Further, there is no need to dispose a member constituting the antilock brake system inside the passenger compartment.

In the antilock brake system according to the second idea, in addition to the function described above, it is possible to send the signals detected by the sensors to the circuit of the electronic unit via the electric wiring section incorporated in the junction block by connecting the first connector to the second group of terminals provided in the housing of the junction block. On top of this, it is also possible to send to the hydraulic unit control signals formed in the circuit of the electronic unit through the electric wiring section incorporated in the junction block by connecting the second connector with the third group of terminals.

DETAILED DESCRIPTION OF THE PREFERRED EMBODIMENTS

Referring to FIGS. 1 to 6, embodiments of an antilock brake system according to the present invention will be described.

Figure 5:
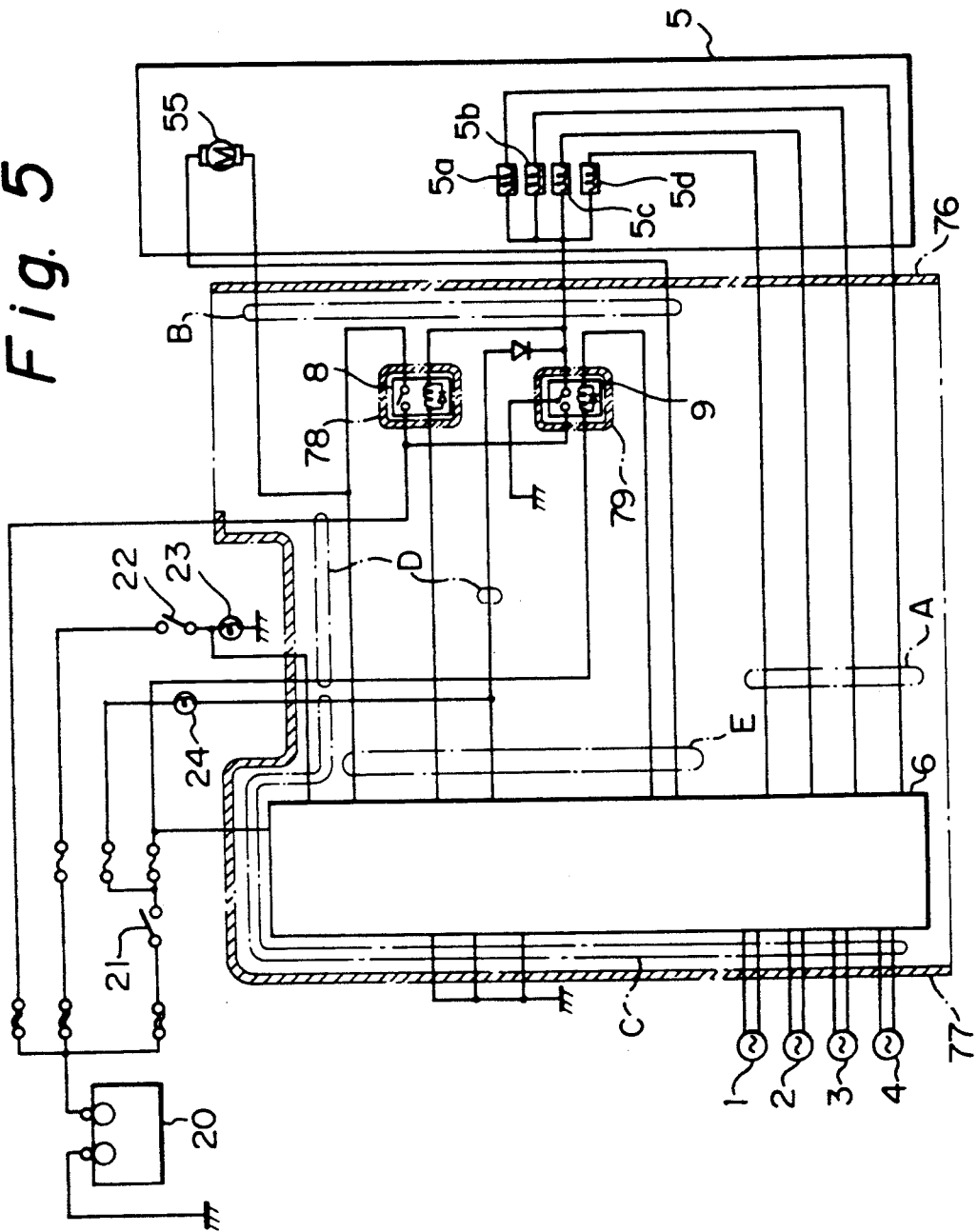
FIG. 5 is a diagram showing electric connections of the antilock brake system of the present invention.
Figure 8:
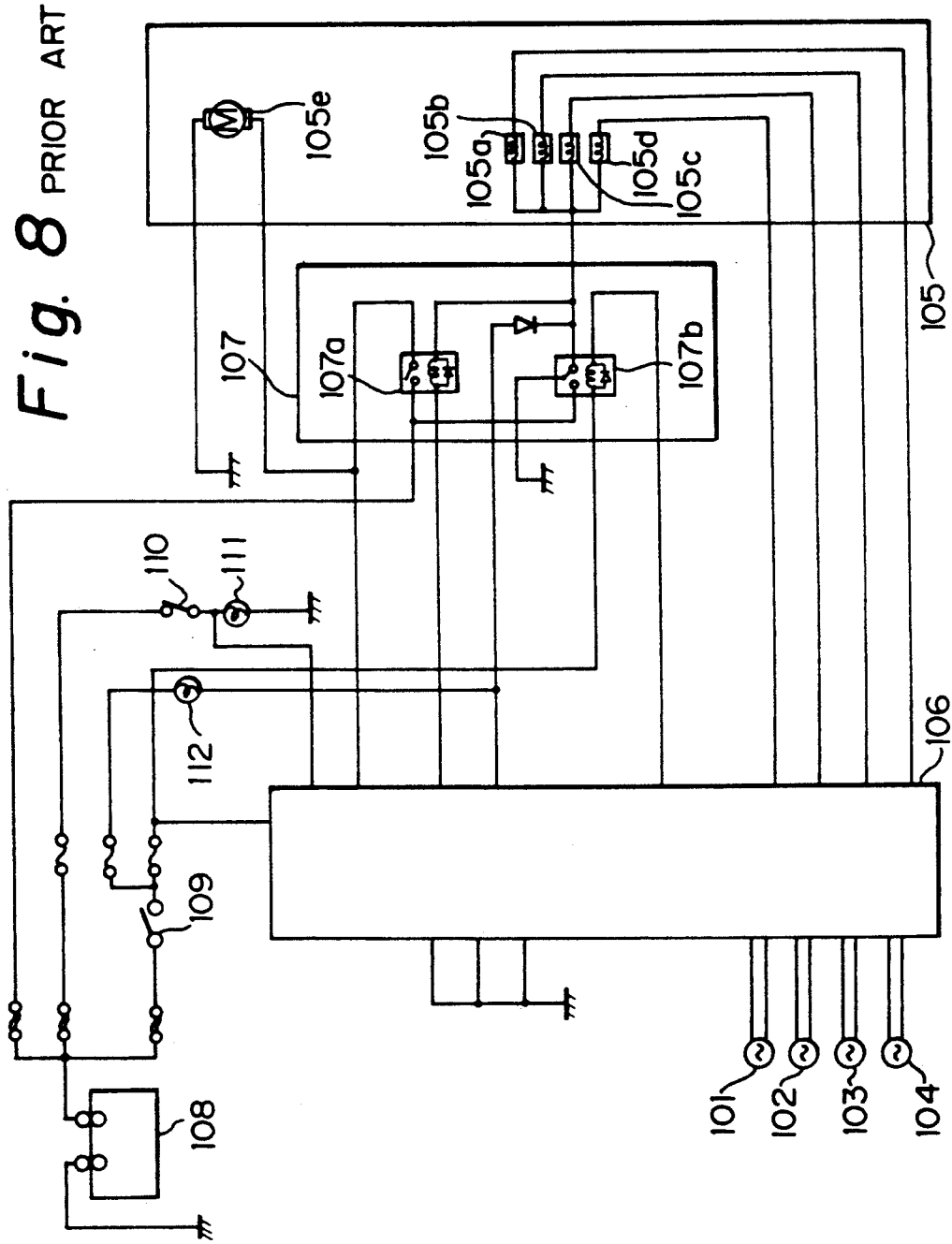
FIG. 8 is a diagram showing electric connections of the conventional antilock brake system.

An embodiment of the antilock brake system shown in FIG. 5 has almost the same electrical construction as that of a conventional antilock brake system shown in FIG. 8, and functions completely in the same way as the latter system. Therefore, the description of the function of the former antilock brake system will be omitted herein.

Figure 1:
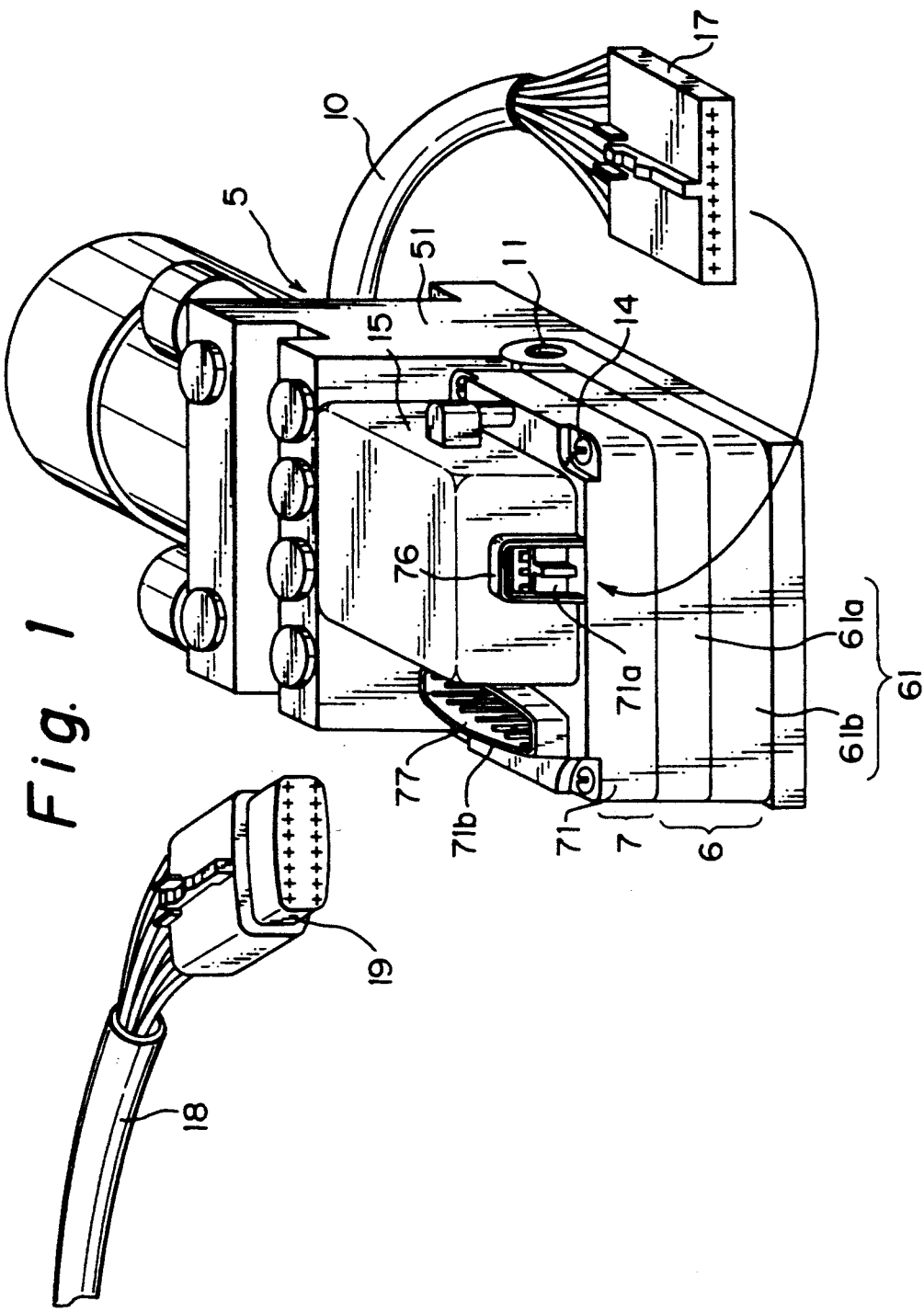
FIG. 1 is a perspective view showing the main part of an antilock brake system according to the present invention.
Figure 2:
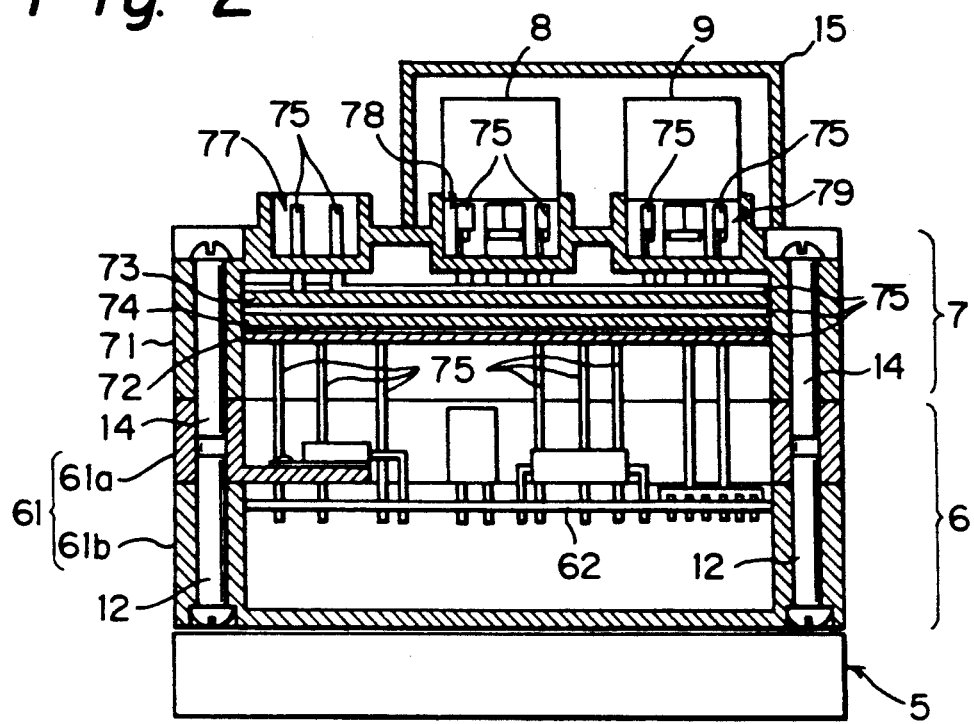
FIG. 2 is a longitudinal cross-sectional view of FIG. 1.

As shown in FIGS. 1 and 2, the antilock brake system of this embodiment comprises a hydraulic unit 5, an electronic unit 6, a junction block 7, and relays 8, 9. These hydraulic unit 5, electronic unit 6, and relays 8, 9 correspond to the hydraulic unit 105, electronic unit 106, motor relay 107a, and fail safe relay 107b of the aforesaid conventional antilock brake system. The electric connection of the electric unit 6 with the junction block 7 is effected by connecting a bus bar 75 (refer to FIG. 2) constituting the wiring inside the junction block 7 with a printed circuit board 62 inside the electronic unit 6 by virtue of soldering.

In addition, the wiring between the hydraulic unit main body 5 and the junction block 7 is effected by means of a wiring harness 10 (refer to FIG. 1). A lower housing 61b of the electronic unit 6 is connected to a housing 51 of the hydraulic unit main body 5 by means of a bolt 11, and a housing 71 of the junction block 7 is connected to an upper housing of the electronic unit 6. The connecting structure of these hydraulic unit main body 5, electronic unit 6, junction block 7, and relays 8, 9 will be described in detail.

Figure 3:
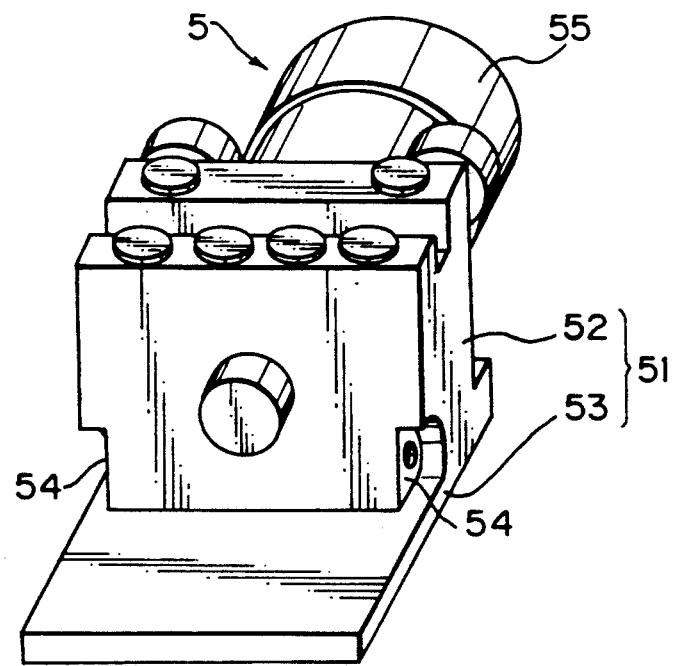
FIG. 3 is a perspective view of a hydraulic unit main body.

As shown in FIG. 3, the housing 51 of the hydraulic unit main body 5 comprises a housing main body 52 incorporating solenoid valves 5a to 5d and control valves (not shown) adapted to operate in accordance with the switching of the solenoid valves 5a to 5d, and a flat base 53. A pair of symmetrical connecting portions 54 for connecting the housing 61 of the electronic unit 6 to the housing 51 are formed near a border portion between the housing main body 52 and the base 53. In addition, a motor 55 connected to a plunger pump of this hydraulic unit main body 5 is provided on the rear side of the housing main body 52.

The function of this hydraulic unit main body 5 is the same as that of the above-stated conventional hydraulic unit 105, and therefore the detailed description thereof will be omitted herein.

Figure 4:
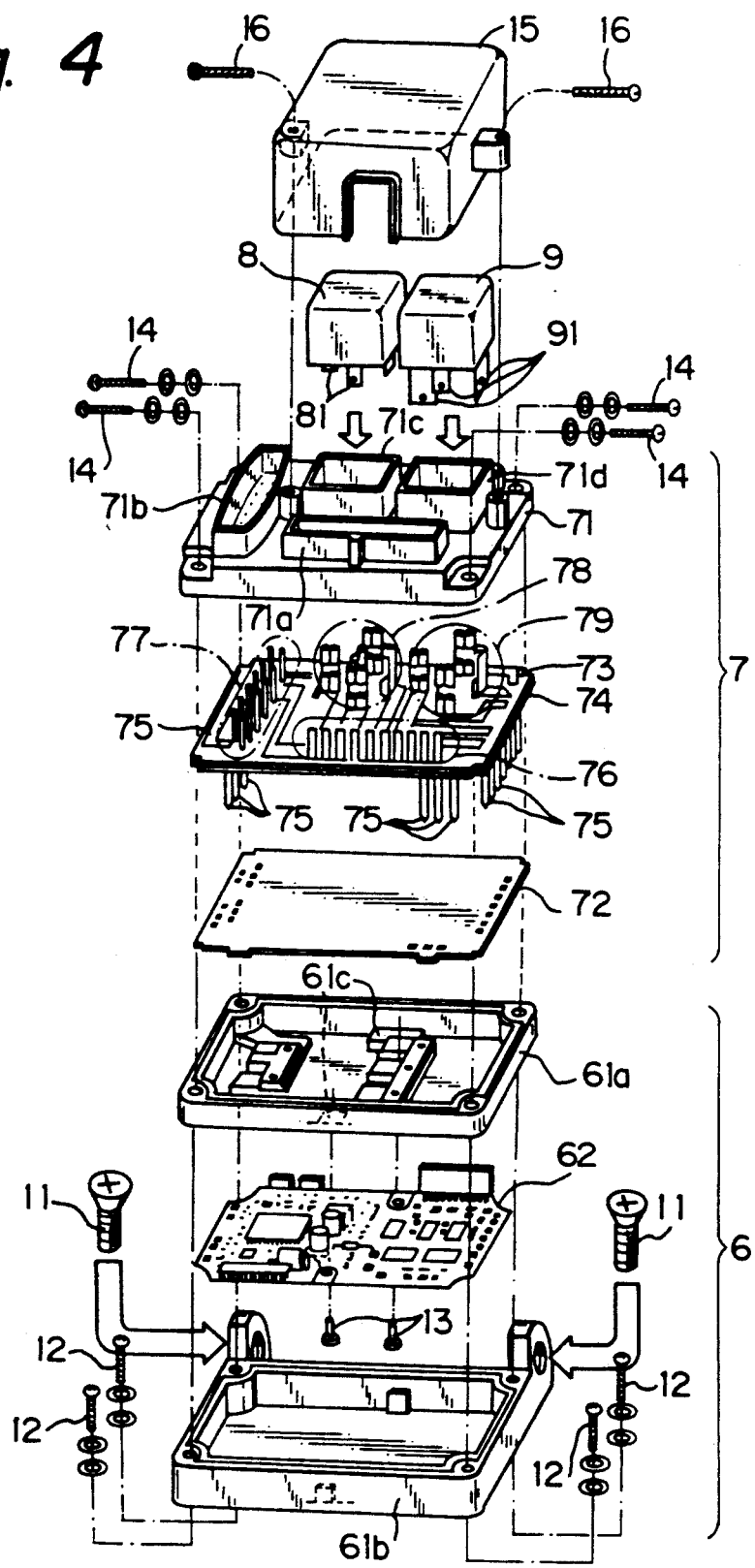
FIG. 4 is an exploded perspective view of a part of the main part of FIG. 1 from which the hydraulic unit is removed.

As shown in FIG. 4, the housing 61 of the electronic unit 6 comprises a frame-like upper housing 61a and the lower housing 61b having a bottom, and these two housings are connected to each other at the corner portions thereof by means of a plurality of screws 12 inserted from below the lower housing 61b.

Mounting pieces 61c are formed on the inner circumference of the upper housing 61a in such a manner as to protrude inwardly, and the printed circuit board 62 of the electronic unit 6 is fixed to the bottom sides of the mounting pieces 61c by means of screws 13. This printed circuit board 62 has an element constituting the control section of the electronic unit 6. As shown in FIG. 2, the printed circuit board 62 is disposed inside the housing in a state in which the upper housing 61a and lower housing 61b are connected together.

As shown in FIG. 2, the junction block 7 is constructed in such a manner that insulating plates 73, 74 are disposed in a space formed between the upper housing 71 and a lower housing 72 and that a plurality of bus bars 75 constituting the wiring inside the junction block 7 are supported on these insulating plates 73, 74. This junction block 7 has groups of terminals 76 to 79. The group of terminals 76 is a group of terminals to which the wiring harness 10 connected to the hydraulic unit main body 5 is connected. The group of terminals 77 is a group of terminals to which a wiring harness 18 is connected which is connected to an external element other than the hydraulic unit main body 5, electronic unit 6, junction block 7, and relays 8, 9 (refer to FIG. 1). The groups of terminals 78, 79 are groups of terminals to which the relays 8, 9 are connected, respectively. The respective terminals constituting these groups of terminals 76 to 79 are formed integrally with any of the bus bars 75.

In FIG. 5 showing a diagram illustrating electric connections, all of the following wiring are constituted by the bus bars 75: wiring A between predetermined terminals of the group of terminals 76 and the electronic unit 6; wiring B between remaining terminals of the group of terminals 76 and predetermined terminals of the groups of terminals 78, 89; wiring C between predetermined terminals of the group of terminals 77 and the electronic unit 6; wiring D between remaining terminalsof the group terminals 77 and predetermined terminals of the groups of terminals 78, 79; and wiring E between predetermined terminals of the groups of terminals 78, 79 and the electronic unit 6. The three-layered bus bars 75 constituting the above wiring A to E are, as described previously, insulated by means of the two insulating plates 73, 74. As shown in FIG. 2, the lower housing 72 is inserted into the upper housing 71 from below the latter, and is fixed to the interior wall of the upper housing 71 at such a predetermined position as to form a space between itself and the top side of the upper housing 71 by virtue of snap-in fitting or the like.

The bus bars 75 are disposed on the top side of the insulating plate 73, between the insulating plates 73, 74, and on the bottom side of the insulating plate 74. The bus bars 75 are fixed to the insulating plates 73, 74 by forming small holes in themselves, forming on the insulating plates 73, 74 projections to be inserted into these small holes, and by crushing the leading ends of the projections after allowing the projections to fit in the small holes. The groups of terminals 76, 77 are formed by allowing the ends of the bus bars 75 to project upwardly, and the groups of terminals 76 to 79 protrude from the top side of the upper housing 71 of the junction block 7 after passing therethrough.

These groups of terminals 76 to 79 are each surrounded by side walls 71a to 71d. The other ends of the bus bars 75 constituting the wiring A, C, E are caused to project downwardly so as to pass through the lower housing 72, with the leading ends thereof being connected with the terminals of the printed circuit board 62 by virtue of soldering or the like.

The junction block 7 is connected to the upper housing 61a of the electronic unit 6 by means of screws 14 passing vertically through the corner portions of the upper housing 71.

The relays 8, 9 are mounted on the upper housing 71 of the junction block 7 by allowing the lower end portions of the housings therefor to fit in the side walls 71c, 71d surrounding the groups of terminals 78, 79, respectively. In this mounting state, the terminals 81, 91 of the relays 8, 9 are brought into contact with predetermined terminals of the groups of terminals 78, 79, respectively. In addition, a cover 15 for receiving the relays 8, 9, and the group of terminals 76 of the junction block 7 is secured to the upper housing 71 by means of screws 16. This cover 15 is mounted on the upper housing 71 after a connector 17 (refer to FIG. 1) connected to the wiring harness 10 has been connected to the group of terminals 76.

Figure 7:
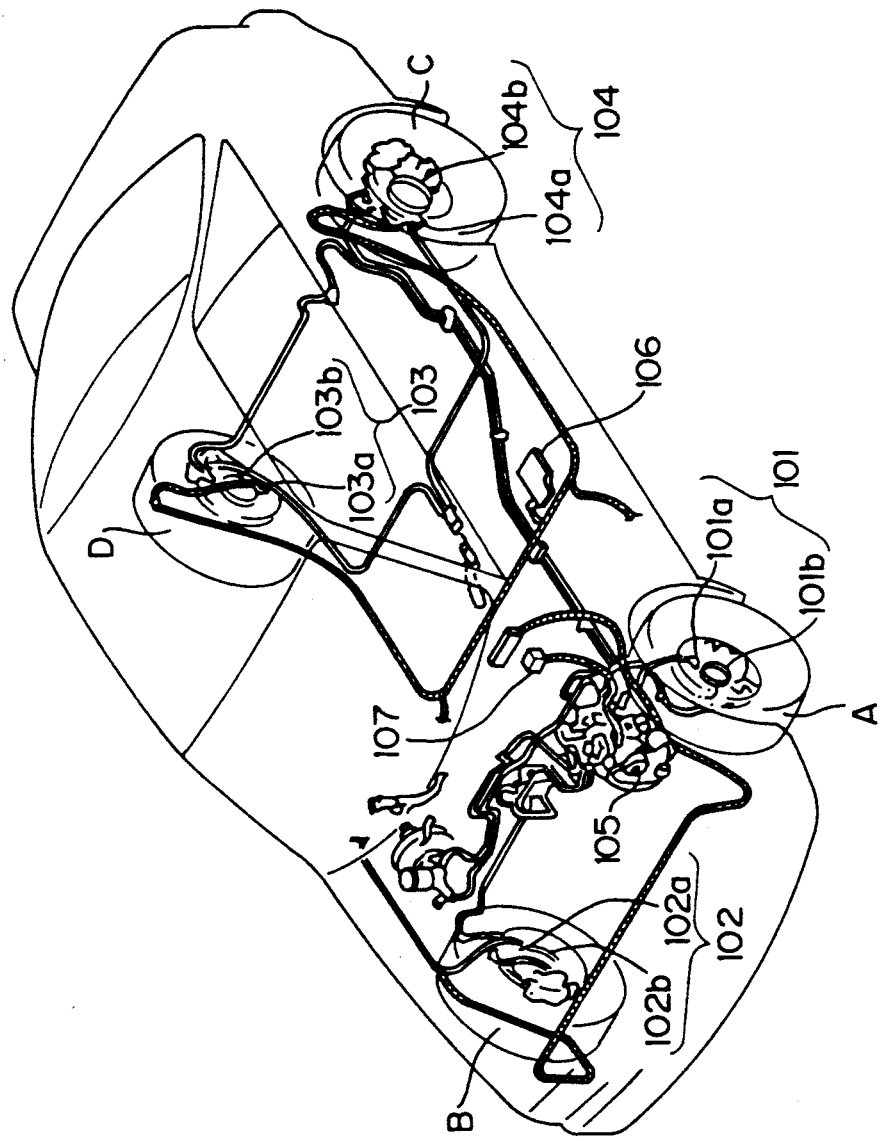
FIG. 7 is a schematic explanatory view of a conventional antilock brake system.

The hydraulic unit main body 5, electronic unit 6, junction block 7, and relays 8, 9 are integrated into one unit as described above, and are disposed at a position similar to that of the hydraulic unit 105 of the conventional antilock brake system, as shown in FIG. 7. The wiring harness 18 (refer to FIG. 1) connected to the external elements such as rotation detectors 1 to 4 (refer to FIG. 5) of the antilock brake system of the present invention is connected to the group of terminals 77 of the junction block 7. A connector 19 which fits inside a side wall 71b surrounding the group of terminals 77 is connected to the leading ends of this wiring harness 18.

In FIG. 5, reference numeral 20 denotes a battery for an automobile, reference numeral 21 an ignition switch, reference numeral 22 a stop lamp switch disposed in the vicinity of the brake pedal, reference numeral 23 a stop lamp constituting a part of the rear lamp, and reference numeral 24 a warning lamp for warning of irregularity of the antilock brake system.

Thus, in the antilock brake system according to the present invention, the groups of terminals 76 to 79 are provided on the housing 71 of the junction block 7 disposed inside the engine compartment, the upper housing 61a of the electronic unit 6 is made integral with the housing 71, and electric connections between the groups of terminals 76 to 79 and the electronic unit 6 are effected via the bus bars 75 constituting the electric wiring section inside the junction block 7. Due to this construction, even if the antilock brake system is equipped on an automobile, there is no need to provide a new wiring harness extending between the engine compartment and the passenger compartment therefor. In addition, in this embodiment, the relays 8, 9 are connected to the groups of terminals 78, 79 protruding from the upper housing 71 of the junction block 7, respectively. This also obviates the necessity inherent in the conventional antilock brake system of provision of wiring harnesses between the relays 8, 9 and the hydraulic unit main body 5, or the relays 8, 9 and the electronic unit 6 for electric connection therebetween. Therefore, the wiring harness mounting operation can be simplified in this respect.

Figure 6:
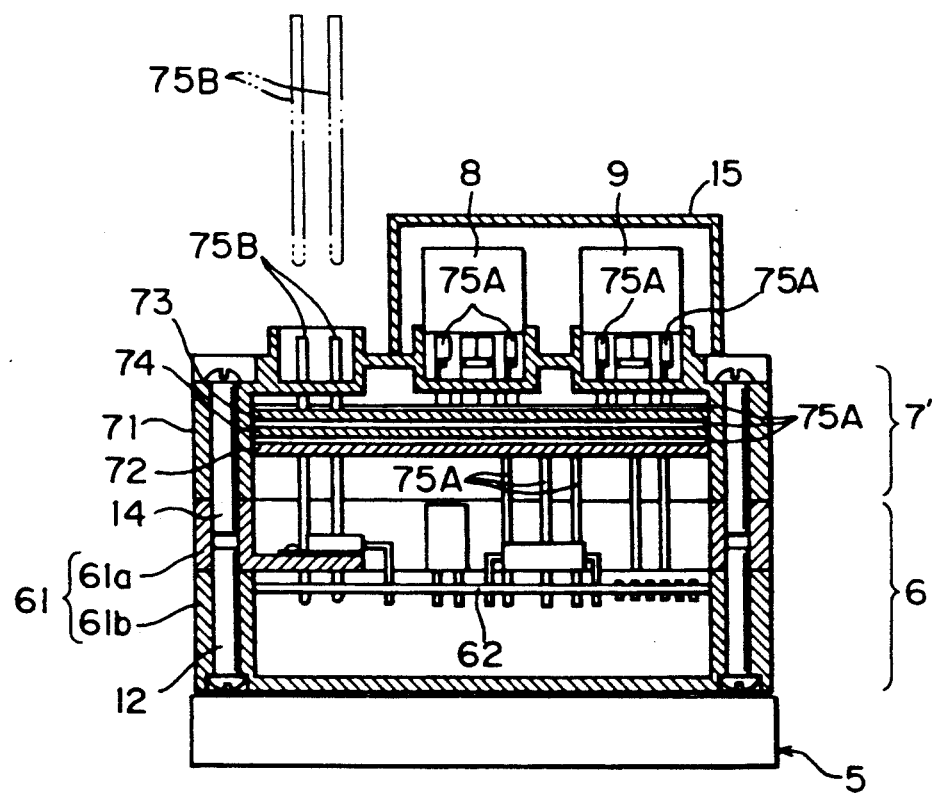
FIG. 6 is a longitudinal cross-sectional view showing the main part of another antilock brake system according to the present invention.

In another antilock brake system of the present invention the main part of which is shown in FIG. 6, a junction block 7' in which a part of the wiring thereinside is constituted by pins 75B is provided. In other words, in this junction block 7', the following wiring is constituted by the pins 75B: wiring connected to a group of terminals 76; wiring A directly connecting terminals constituting this group of terminals 76 with an electronic unit 6 (not shown in FIG. 6); and wiring connected to a group of terminals 77, wiring C directly connecting terminals constituting this group of terminals 77 with the electronic unit 6.

In this junction block 7', wiring B, D, and E are constituted by bus bars 75A which are similar to the bus bars 75 of the previously described embodiment. As shown by phantom lines in FIG. 6, after all the other constituent elements of the electronic unit 6 and the junction block 7' have been fabricated and connected to each other properly, the pins 75B are inserted into the integrated body of the electronic unit 6 and the junction block 7' from above the junction block 7', and when inserted in this manner, the lower ends of the pins 75B are connected to a printed circuit board 62 of the electronic unit 6. In addition, the upper ends of the pins 75B constitute the group of terminals 76 or the group of terminals 77. The construction other than the above shown in FIG. 6 is the same as that of the previous embodiment described with reference to FIGS. 1 to 4, and therefore like reference numerals are given to corresponding elements, and the detailed description thereof will be omitted.

For precisely the same reasons as those of the previously described embodiment, in the embodiment shown in FIG. 6, even if the antilock brake system is equipped on an automobile, the increase in the number of wiring harnesses extending between the engine compartment and the passenger compartment is limited. In addition, a wiring harness between the relays 8, 9 and the hydraulic unit main body 5 or the electronic unit 6 is not required.

According to the antilock brake system of the present invention, since the electronic unit is made integral with the relays and is disposed inside the engine compartment, there is no need to provide a component of the antilock brake system inside the passenger compartment, and thus there is an advantage in that provision of the antilock brake system does not constitute a limitation to the enlargement of the interior space in the passenger compartment. In addition, the wiring harness connecting the junction block to which the relays are connected with the hydraulic unit may be very short, and there is no need to provide a wiring harness extending between the engine compartment and the passenger compartment for the antilock brake system, resulting in an advantage in that, when compared with the conventional case, the wiring harness mounting operation that is carried out in the event that an antilock brake system is equipped can be simplified, thereby making it possible to improve the efficiency of production.

Furthermore, according to the antilock brake system of the present invention, since there is no need to provide an electronic unit inside the passenger compartment as before, there is provided an advantage in that provision of an antilock brake system does not constitute a limitation to the enlargement of the interior space in the passenger compartment.

What is claimed is:

1. An antilock brake system comprising:
   sensors (1–4) for detecting the rotating conditions of respective wheels of an automobile;
   a hydraulic unit (5) for controlling brake fluid pressures applied to wheel cylinders of said respective wheels via electric control signals;
   an electronic circuit unit (6) incorporating a circuit for forming said electric control signals for controlling said brake fluid pressures based on detected signals of said sensors so that said wheels are not locked;
   and two relays (8 and 9), one electrically connected to solenoid valves of said hydraulic unit and said circuit of said electronic unit, another electrically connected to a motor of said hydraulic unit and said circuit of said electronic unit, said two relays disposed inside an engine compartment of the automobile;
   said antilock brake system further comprising a junction block (7) having a housing (71 and 72) connected integrally to a housing (61) of said electronic unit, a group of terminals (78 and 79) provided in said housing of said junction block for electric connection with said relays, and an electric wiring section (75) incorporated in said housing of said junction block for effecting electric connection between said circuit of said electronic unit and said group of terminals.

2. An antilock brake system comprising:
   sensors (1–4) for detecting the rotating conditions of respective wheels of an automobile;
   a hydraulic unit (5) for controlling brake fluid pressures applied to wheel cylinders of said respective wheels via electric control signals;
   an electronic unit (6) incorporating a circuit for forming said electric control signals for controlling switching of solenoid valves of said hydraulic unit based on detected signals of said sensors so that said wheels are not locked;
   and two relays (8 and 9), one electrically connected to said solenoid valves of said hydraulic unit and said circuit of said electronic unit, another electrically connected to a motor of said hydraulic unit and said circuit of said electronic unit, said two relays disposed inside an engine compartment of the automobile;
   said antilock brake system further comprising:
   a first connector (19) connected to a wiring harness (18) including wiring connected to said sensors;

a second connector (17) connected to a wiring harness (10) including wiring for providing control signals to said hydraulic unit; and a junction block (7) having a housing (71 and 72) connected integrally to a housing (61) of said electronic unit, said junction block comprising:

a first group of terminals (78 and 79) to which said respective relays are electrically connected;

a second group of terminals (77) to which said first connector is electrically connected;

a third group of terminals (76) to which said second connector is electrically connected; and an electric wiring section (75) for effecting electric connection between said circuit of said electronic unit and said first, second, and third groups of terminals.

3. An antilock brake system as set forth in claim 1 or claim 2, wherein a housing (51) of said hydraulic unit is connected integrally to said housing of said electronic unit.

4. An antilock brake system as set forth in claim 2, wherein said circuit of said electronic unit comprises a printed circuit board (62), and wherein said second and third groups of terminals comprise pins (75B) which are inserted through the junction block to contact the printed circuit board.

5. An antilock brake system as set forth in claim 1 or claim 2, wherein said electric wiring section (75) comprises bus bars.

* * * * *